US012760814B2

(12) United States Patent
Ridel

(10) Patent No.: US 12,760,814 B2
(45) Date of Patent: Oct. 13, 2026

(54) PULSE GENERATING SYSTEM FOR A PULSED WORKING FLUID SUPPLY, AND INDUSTRIAL MACHINE COMPRISING SUCH A SYSTEM

(71) Applicant: RIDEL, Neufchâtel-en-Bray (FR)

(72) Inventor: Philippe Ridel, Neufchâtel-en-Bray (FR)

(73) Assignee: RIDEL, Neufchâtel-en-Bray (FR)

( * ) Notice: Subject to any disclaimer, the term of this patent is extended or adjusted under 35 U.S.C. 154(b) by 0 days.

(21) Appl. No.: 18/946,660

(22) Filed: Nov. 13, 2024

(65) Prior Publication Data

US 2025/0155048 A1 May 15, 2025

(30) Foreign Application Priority Data

Nov. 15, 2023 (FR) ...................................... 2312501

(51) Int. Cl.
*F16K 31/124* (2006.01)
*B05B 12/06* (2006.01)
*F16K 37/00* (2006.01)

(52) U.S. Cl.
CPC ............ *F16K 31/124* (2013.01); *B05B 12/06* (2013.01); *F16K 37/005* (2013.01)

(58) Field of Classification Search
CPC ............... F16K 31/124; F16K 31/1221; F16K 31/1223; B05B 12/06
See application file for complete search history.

(56) References Cited

U.S. PATENT DOCUMENTS

| | | | | |
|---|---|---|---|---|
| 5,884,894 | A | 3/1999 | Smith | |
| 5,927,329 | A * | 7/1999 | Yie | B05B 1/3046 251/30.01 |
| 6,131,307 | A | 10/2000 | Komino et al. | |
| 7,744,060 | B2 * | 6/2010 | Sneh | F16K 31/1221 251/331 |
| 9,092,038 | B2 * | 7/2015 | Schuler | G05D 16/202 |
| 9,410,639 | B2 * | 8/2016 | Fukano | F16K 31/124 |
| 10,773,271 | B2 * | 9/2020 | Funseth | A01M 7/0089 |

(Continued)

FOREIGN PATENT DOCUMENTS

| | | | |
|---|---|---|---|
| CN | 208139688 | U | 11/2018 |
| CN | 209753520 | U | 12/2019 |

(Continued)

OTHER PUBLICATIONS

French Search Report for FR2312501 dated May 21, 2024, 15 pages.

*Primary Examiner* — Michael R Reid
(74) *Attorney, Agent, or Firm* — NIXON & VANDERHYE

(57) ABSTRACT

A pulse generating system for a pulsed working fluid supply, comprising a pipe, a source of pressurized working fluid connected to the pipe, an angle-seat valve connected to the pipe, a source of pressurized control fluid, a pressure regulator connected to the source of pressurized control fluid, a three-port, two-position control valve connected to the pressure regulator and to the angle-seat valve and configured to control the angle-seat valve, and a control device configured to control the pressure regulator as a function of desired pulse amplitudes and to control the control valve as a function of desired pulse frequencies. The invention also relates to a washing machine comprising a system.

7 Claims, 2 Drawing Sheets

(56) References Cited

U.S. PATENT DOCUMENTS

| | | | |
|---|---|---|---|
| 2019/0240688 A1* | 8/2019 | Girvin | B05B 12/082 |
| 2022/0034698 A1 | 2/2022 | Fliess et al. | |

FOREIGN PATENT DOCUMENTS

| | | | |
|---|---|---|---|
| CN | 210689156 | U | 6/2020 |
| CN | 214746777 | U | 11/2021 |
| CN | 111251191 | B | 6/2022 |
| CN | 216937439 | U | 7/2022 |
| CN | 115970013 | A | 4/2023 |
| EP | 0486711 | B1 | 8/1994 |
| JP | 4578644 | B2 | 9/2010 |
| JP | 5226575 | B2 | 3/2013 |
| WO | 2016063499 | A1 | 4/2016 |
| WO | 2022090996 | A1 | 5/2022 |

* cited by examiner

PULSE GENERATING SYSTEM FOR A PULSED WORKING FLUID SUPPLY, AND INDUSTRIAL MACHINE COMPRISING SUCH A SYSTEM

This application claims priority to FR 2312501 filed Nov. 15, 2023, the entire contents of which are hereby incorporated by reference.

The present invention relates to the technical field of working fluid supply systems, and more particularly concerns a pulse generating system for a pulsed working fluid supply, and an industrial machine comprising such a system.

Systems intended for generating pulses of working fluid, for example compressed air, already exist. The patent application WO2016063499 A1 discloses, for example, an intermittent air generation device. However, existing systems are generally complex and costly. Moreover, with existing systems, it is often complicated to guarantee reliable operation at high pulse frequencies, and to vary frequency and pressure with each pulse.

Consequently, prior art solutions proposed for working fluid supply systems still present drawbacks, and improvements are possible.

In particular, the present invention aims to solve the problems indicated above by proposing a pulse generating system for a pulsed working fluid supply having a simple structure and allowing reliable operation at high frequencies, and an industrial machine comprising such a system.

Thus, the present invention has as its object a pulse generating system for a pulsed working fluid supply, wherein the system comprises: a pipe, comprising an inlet end and an outlet end through which pulsed working fluid is delivered; a source of pressurized working fluid, fluidly connected to the inlet end of the pipe; an angle-seat valve, fluidly connected to the pipe between the inlet end and the outlet end, the angle-seat valve comprising a piston movable between a first end-of-stroke position, in which the piston completely closes the pipe, and a second end-of-stroke position, in which the piston opens the pipe with a maximum opening of the angle-seat valve; a source of pressurized control fluid; a pressure regulator, fluidly connected to the source of pressurized control fluid and configured to regulate a pressure of the control fluid; a three-port, two-position control valve, a first port of the control valve is connected to the pressure regulator, a second port of the control valve is connected to the angle-seat valve and a third port of the control valve is connected to a control fluid outlet, the three-port, two-position control valve being configured to control displacement of the angle-seat valve piston to any position between the first end-of-stroke position and the second end-of-stroke position, and including the first end-of-stroke position and the second end-of-stroke position, by means of the control fluid whose pressure is regulated by the pressure regulator; and a control device in communication with the pressure regulator and the three-port two-position control valve, the control device being configured to control the pressure regulator as a function of desired pulse amplitudes and to control the three-port two-position control valve as a function of desired pulse frequencies, so as to displace, in a proportional manner, the piston of the angle-seat valve and generate pulses of pulsed working fluid.

This configuration allows a pulse generating system for a pulsed working fluid supply to be obtained, configured to generate pulses of pulsed working fluid, which has a simple structure and allows reliable operation at high frequencies.

The pulse generating system according to the invention can comprise several angle-seat valves in series on the pipe according to the preceding type, each angle-seat valve having its source of pressurized control fluid, a pressure regulator, fluidly connected to the source of pressurized control fluid and a three-port, two-position control valve, the individual angle-seat valves being controlled in a synchronized manner by means of the control device.

According to a particular embodiment, the three-port, two-position control valve is one from among a three-port on-off valve or a 3/2 distribution valve.

In particular, these types of valve allow the system to operate at high frequencies.

It will be understood that a three-port on/off valve can, for example, be a three-port on/off valve comprising a servomotor actuating a stem comprising a shutter. It will also be understood that the 3/2 distribution valve can, for example, be selected from among an electrically controlled distributor, an electromagnetically controlled distributor and a hydraulically controlled distributor. It will also be understood that in the case of an electromagnetically controlled distributor or a hydraulically controlled distributor, the control device comprises electromagnetic control means, such as one or several electromagnets supplied with power and controlled by electronic circuits such as a processor, microprocessor, microcontroller, DSP, FPGA or ASIC, or hydraulic control means, such as an hydraulic distributor, configured to control the 3/2 distribution valve.

According to one particular embodiment, the angle-seat valve is of the normally closed type and is controlled in opening by means of the control fluid, in such a way that the first end-of-stroke position of the piston is a rest position.

It will be understood that the use of a normally closed angle-seat valve allows, in particular, the safety and reliability of the system to be improved. It will be understood however that, according to non-preferred alternatives, a normally open type angle-seat valve or an angle-seat valve controlled both in opening and in closing by the control fluid could also be used. It will also be understood that in the latter case, the control valve must also be chosen to allow control of the opening and closing of the angle-seat valve.

According to one particular embodiment, the system further comprises a pressure sensor arranged at the outlet end of the pipe, the pressure sensor being configured to measure a pressure of the working fluid and to be in communication with the control device.

According to a particular embodiment, the system is a feedback system, and the control device is configured to regulate the control of the pressure regulator as a function of the pressure measurements received from the pressure sensor.

It will be understood that this configuration allows the pressure accuracy of the working fluid pulses generated to be improved.

According to one particular embodiment, the control device comprises memory means, such as ROM, RAM, DRAM, and is further configured to perform automatic learning regarding the pressure regulator control as a function of pressure measurements from the pressure sensor, in order to, in use, predict more accurate pressure regulator control for a desired pulse amplitude.

It will be understood that this configuration allows, in particular the system to be calibrated and to take account of particularities, for example dimensions, of the installation, so as to reduce the need for feedback once automatic learning has taken place. It will also be understood that this configuration is particularly suitable in the case where the system is intended to be sold in kit form and assembled by a user, for example for retrofitting to an existing installation.

According to one particular embodiment, the control device comprises a programmable logic controller (PLC).

According to one particular embodiment, the pressure regulator is an analog pressure regulator.

It will be understood that the use of an analog pressure regulator allows, in particular, very precise and rapid regulation of the control fluid pressure.

According to one particular embodiment, at least one from among the working fluid and the control fluid is air.

It will be understood, however, that the working fluid and control fluid could be other fluids. For example, the working fluid could be water. Again, for example, the control fluid could be oil.

The present invention also has as its object an industrial machine, in particular a washing machine, comprising a system according to the invention and a member using pulsed air, fluidly connected to the outlet end of said system, so as to be supplied with pulsed working fluid. When the industrial machine is a washing machine, the member using pulsed air may, for example, be a washing spray bar.

It will be understood that a washing machine according to the invention can take various forms, for example, a machine for washing industrial parts, for example, for washing industrial parts after a machining operation, or an automatic washing machine for vehicles, for example, cars.

Particular embodiments of the present invention will now be described, with reference to the appended drawings.

Figure 1:
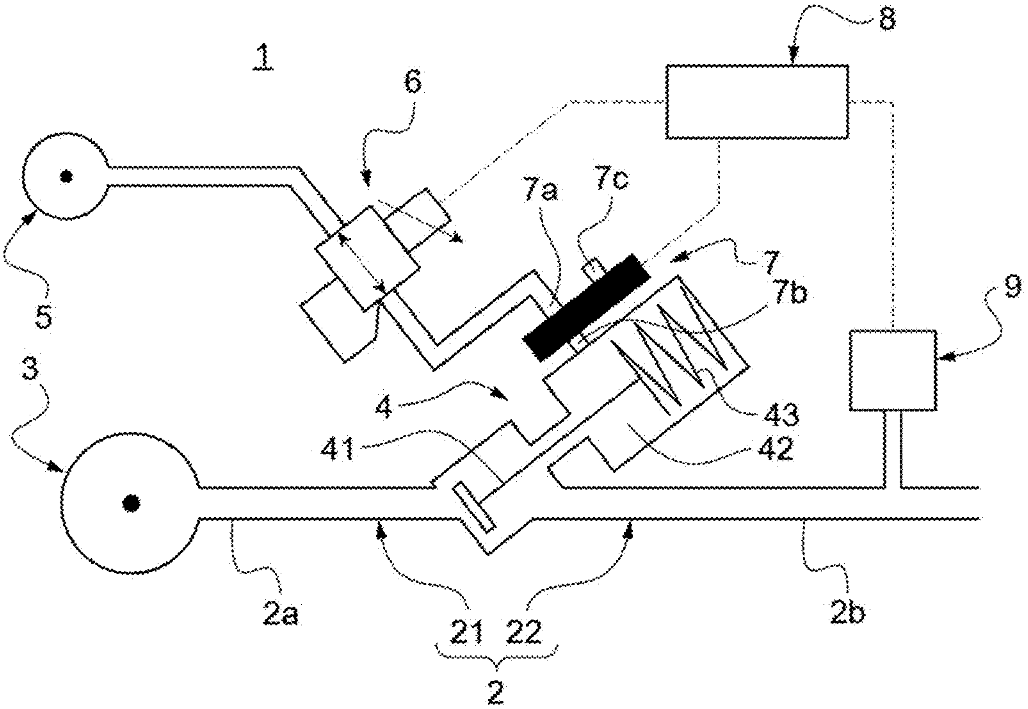
FIG. 1 is a schematic representation of a pulse generating system for a pulsed working fluid supply according to one embodiment of the invention.

Referring first to FIG. 1, it can be seen that a pulse-generating system 1 for a pulsed working fluid supply according to one embodiment of the invention is represented.

The system 1 comprises a pipe 2, a source of pressurized working fluid 3, an angle-seat valve 4, a source of pressurized control fluid 5, a pressure regulator 6, a three-port, two-position control valve 7, and a control device 8.

The pipe 2 comprises an inlet end 2*a*, configured to admit the pressurized working fluid, and an outlet end 2*b*, through which pulsed working fluid is delivered.

According to the embodiment represented in FIG. 1, the pipe 2 comprises a first pipe element 21 and a second pipe element 22, each presenting in the form of a straight cylindrical tube. However, it is understood that, alternatively, the pipe elements 21, 22 could present other forms, for example in the form of flexible hoses.

The source of pressurized working fluid 3 is fluidly connected to the inlet end 2*a* of the pipe 2. The working fluid is preferably air. However, it is understood that, alternatively, the working fluid could be any other fluid, for example, water. The source of pressurized working fluid may, for example, be a compressor, a pressure accumulator or a pressurized fluid line in a building, for example a compressed air line.

The angle-seat valve 4 is fluidly connected to the pipe 2 between the inlet end 2*a* and the outlet end 2*b*. According to the embodiment represented in FIG. 1, the angle-seat valve 4 is connected between the first pipe element 21 and the second pipe element 22.

In addition, the angle-seat valve 4 comprises a piston 41 movable between a first end-of-stroke position, in which the piston 41 completely closes the pipe, and a second end-of-stroke position, in which the piston 41 opens the pipe with maximum opening of the angle-seat valve 4.

It will be understood that the seat of the angle seat valve 4 is inclined toward the outlet end 2*b* of the pipe 2, so as to promote fluid flow from the inlet end 2*a* toward the outlet end 2*b* and avoid a water hammer effect.

The angle-seat valve 4 also comprises a control chamber 42 and a spring 43 arranged in the control chamber 42, the spring 43 being configured to bias the piston 41 toward a rest position.

According to the embodiment in FIG. 1, the angle-seat valve 4 is of the normally closed type and is controlled in opening by means of the control fluid, in such a way that the first end-of-stroke position of the piston 41 corresponds to the rest position. It will be understood that the use of a normally closed angle-seat valve 4 allows, in particular, the safety and reliability of the use of the system 1 to be improved. However, it will also be understood that, according to non-preferred alternatives, a normally open type angle-seat valve 4 or an angle-seat valve 4 controlled both in opening and in closing by means of the control fluid could also be used. It will also be understood that in the latter case, the control valve 7 must also be selected to allow opening and closing of the angle-seat valve 7 to be controlled.

The source of the pressurized control fluid 5 is configured to supply control fluid intended to be delivered into the control chamber 42 to control the angle-seat valve 4. The control fluid is preferably air. It will be understood, however, that alternatively, the control fluid could be any other fluid, for example, oil. The source of the pressurized control fluid 5 can, for example, be a compressor, a pressure accumulator, a pressurized fluid line in a building, for example a compressed air line.

The pressure regulator 6 is fluidly connected to the source of the pressurized control fluid 5 and is configured to regulate a pressure of the control fluid downstream of the source of the pressurized control fluid 5. Preferably, the pressure regulator 6 is an analog pressure regulator 6, which allows, in particular, highly precise and rapid regulation of the control fluid pressure.

The three-port, two-position control valve 7 is fluidly connected to the pressure regulator 6 and the angle-seat valve 4. A first port 7*a* of the control valve 7 is connected to the pressure regulator 6, a second port 7*b* of the control valve 7 is connected to the control chamber 42 of the angle-seat valve 4, and a third port 7*c* of the control valve 7 is connected to a control fluid outlet.

According to the embodiment represented in FIG. 1, the control fluid outlet is an ambient air outlet, in other words, an outlet opening onto the immediate environment of the system 1, at atmospheric pressure. It will be understood, however, that the control fluid outlet can also open onto a control fluid recovery tank, for example if the control fluid is oil.

It will also be understood that a first position of the three-port, two-position control valve 7 fluidly connects the second port 7*b* to the third port 7*c*, in such a way that the working fluid can exit the control chamber 42 and pass through the control fluid outlet, and that a second position of the three-port, two-position control valve 7 fluidly connects the first port 7*a* to the second port 7*b*, in such a way that the working fluid, from the pressure regulator 6, is introduced into the control chamber 42. Preferably, the three-port, two-position control valve 7 is a three-port on/off valve or a 3/2 distribution valve. In particular, these types of valve allow the system 1 to operate at high frequencies.

It will be understood that a three port on/off valve can, for example, be a three port on/off valve comprising a servomotor actuating a stem comprising a shutter. It will also be understood that the 3/2 distribution valve can, for example, be selected from among an electrically controlled distribution valve, an electromagnetically controlled distribution valve, an electropneumatically controlled distribution valve and a hydraulically controlled distribution valve. It will also be understood that in the case of an electromagnetically or hydraulically controlled distribution valve, the control device 8 comprises electromagnetic control means, such as one or several electromagnets controlled by electronic circuits, or hydraulic control means, such as an hydraulic distributor, configured to control the 3/2 distribution valve.

Furthermore, the three port, two position control valve 7 is configured to control a displacement of the piston 41 of the angle-seat valve 4 to any position between the first end-of-stroke position and the second end-of-stroke position, including the first end-of-stroke position and the second end-of-stroke position, by means of the control fluid, which is pressure regulated by the pressure regulator 6.

It will also be understood that, as a function of the pressure of the control fluid delivered to the control chamber 42 of the angle-seat valve 4 by the three-way, two-position control valve 7, the piston 41 can be positioned in the first end-of-stroke position, in the second end-of-stroke position or in any intermediate position between the first end-of-stroke position and the second end-of-stroke position. It will also be understood that, if required, the working fluid can be discharged through the third port 7*c* of the control valve 7 to achieve the desired pressure in the control chamber 42.

The control device 8 is configured to be in communication with the pressure regulator 6 and the three-port, two-position control valve 7.

The control device 8 is further configured to control the pressure regulator 6 as a function of the desired pulse amplitudes for the working fluid pulses, and to control the three-port, two-position control valve 7 as a function of the desired pulse frequencies for the working fluid pulses, for sequentially delivering the .control fluid at given pressures and frequencies into the control chamber 42 of the angle-seat valve 4, so as to proportionally displace the piston 41 of the angle-seat valve 4 and generate the pulses of pulsed working fluid. The control device may, for example, comprise a programmable logic controller (PLC), for example of the type PID.

According to the embodiment represented in FIG. 1, the system 1 also comprises a pressure sensor 9 arranged at the outlet end 2*b* of the pipe 2. The pressure sensor 9 is configured to measure a pressure of the working fluid at the outlet end 2*b* and to be in communication with the control device 8. Furthermore, the system 1 is a feedback system and the control device 8 is configured to regulate the control of the pressure regulator 6 according to the pressure measurements received from the pressure sensor 9.

Advantageously, the control device 8 comprises memory means and is further configured to perform automatic learning concerning the control of the pressure regulator 6 as a function of pressure measurements from the pressure sensor 9, in order to be able to predict a more accurate control of the pressure regulator 6 for a desired pulse amplitude. It will be understood that, in use, this allows in particular, to calibrate the system 1 and take account of particularities, for example dimensions, of the installation, so as to reduce the need for feedback once automatic learning has taken place. It will also be understood that this configuration is particularly suitable in cases where the system 1 is intended to be sold in kit form and assembled by a user, for example for retrofitting to an existing installation.

Figure 2:
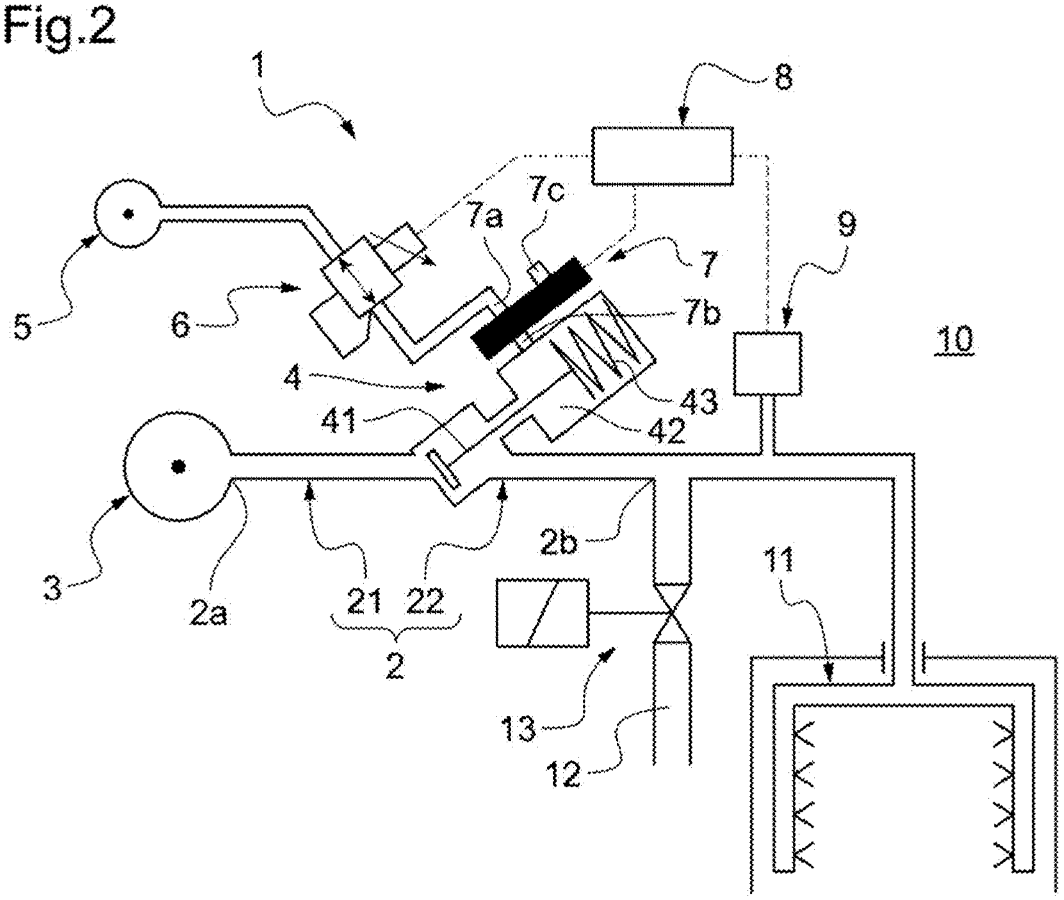
FIG. 2 is a schematic representation of a washing machine according to one embodiment of the invention, comprising the system of FIG. 1.

In reference now to FIG. 2, it can be seen that a washing machine 10 is represented, according to the invention.

The washing machine 10 comprises a system 1 according to the invention, such as described above, and a spray bar 11 fluidly connected to the outlet end 2*b* of the system 1, so as to be supplied with pulsed working fluid.

The washing machine 10 further comprises a detergent solution supply line 12 configured to supply the spray bar 11 with detergent solution and a detergent solution supply control valve 13 configured to open and close the detergent solution supply line. It will be understood that the detergent solution supply line 12 can, for example, be connected to a detergent solution 12 tank, possibly by means of a pump, or be connected to a detergent solution line of a building, for example a water supply line.

As mentioned above, in its first end-of-stroke position, the piston 41 completely closes off the pipe 2 of the pulse generating system 1 for a pulsed working fluid supply. It will therefore be understood that the angle-seat valve 4 of the system 1 is further configured to act as a working fluid supply control valve in the washing machine 10.

The washing machine 10 is thus configured in such a way that the spray bar 11 can be selectively supplied with detergent solution, to wash a workpiece received facing the spray bar 11, and with pulsed working fluid, to remove the detergent solution from a surface of the washed workpiece.

Relative to the use of pressurized working fluid delivered directly by the pressurized working fluid source 3, the use of pulsed working fluid delivered by the system 1 allows the time required to remove the detergent solution from the surface of the workpiece to be reduced, while also reducing the quantity of working fluid required for this removal.

The system 1 according to the invention allows therefore, for example, to limit the compressed air consumption required for a drying process by allowing pulsed compressed air blowing.

For applications involving the removal of detergent solution from the surface of a workpiece, the following sequences can, for example, be used: a succession of 1 second pulses of working fluid spray at the desired pressure, spaced by 0.8 second pauses without spraying, or a succession of 3 second pulses of working fluid spray at the desired pressure, spaced by 1 second pauses without spraying.

Furthermore, the first pulses can be performed at a first pressure, in order to empty the detergent solution present in the spray bar, then the pressure of the pulses can be gradually increased to push the detergent solution to the surface of the washed workpiece and avoid spraying it.

It will be understood that the control device 8 of the system 1 can be configured to control the detergent solution supply control valve 13 of the washing machine 10, or that the washing machine 10 can, in addition, comprise additional control means, in communication with the control device 8 of the system 1, configured to control the detergent solution supply control valve 13.

It will be understood that a washing machine 10 according to the invention can take various forms, for example a machine for washing industrial parts, for example to wash industrial parts after a machining operation, or a machine for automatic washing of vehicles, for example cars.

It is understood that the particular embodiments just described are indicative and non-limiting, and that modifications may be made without departing from the scope of the present invention.

The invention claimed is:

1. A pulse generating system for a pulsed working fluid supply, wherein the system comprises:

a pipe, comprising an inlet end and an outlet end through which pulsed working fluid is delivered;

a source of pressurized working fluid, fluidly connected to the inlet end of the pipe;

an angle-seat valve, fluidly connected to the pipe between the inlet end and the outlet end, the angle-seat valve comprising a piston movable between a first end-of-stroke position, in which the piston completely closes the pipe, and a second end-of-stroke position, in which the piston opens the pipe with a maximum opening of the angle-seat valve;

a source of pressurized control fluid;

a pressure regulator, fluidly connected to the source of pressurized control fluid and configured to regulate a pressure of the control fluid;

a three-port, two-position control valve, a first port of the control valve is connected to the pressure regulator, a second port of the control valve is connected to the angle-seat valve and a third port of the control valve is connected to a control fluid outlet, the three-port, two-position control valve being configured to control displacement of the piston of the angle-seat valve to any position between the first end-of-stroke position and the second end-of-stroke position, including the first end-of-stroke position and the second end-of-stroke position, by means of the control fluid, the pressure of the control fluid being regulated by the pressure regulator; and a control device in communication with the pressure regulator and the three-port, two-position control valve, the control device being configured to control the pressure regulator as a function of desired pulse amplitudes and to control the three-port, two-position control valve as a function of desired pulse frequencies, so as to proportionally displace the piston of the angle-seat valve and generate pulses of pulsed working fluid;

wherein the system further comprises a pressure sensor arranged at the outlet end of the pipe, the pressure sensor being configured to measure a pressure of the working fluid and to be in communication with the control device;

wherein the system is a feedback system, and the control device is configured to regulate the control of the pressure regulator as a function of the pressure measurements received from the pressure sensor; and wherein the control device comprises memory means and is further configured to perform automatic learning, concerning the control of the pressure regulator as a function of the pressure measurements from the pressure sensor, in order to, in use, predict a more accurate control of the pressure regulator for a desired pulse amplitude.

2. The system according to claim 1, wherein the three-port, two-position control valve is one from among a three-port on/off valve and a 3/2 distribution valve.

3. The system according to claim 1, wherein the angle-seat valve is of the normally closed type and is controlled in opening by means of the control fluid, in such a way that the first end-of-stroke position of the piston is a rest position.

4. The system according to claim 1, wherein the control device comprises a programmable logic controller (PLC).

5. The system according to claim 1, wherein the pressure regulator is an analog pressure regulator.

6. The system according to claim 1, wherein at least one from among the working fluid and the control fluid is air.

7. A washing machine comprising a system according to claim 1 and a spray bar fluidly connected to the outlet end of the system, so as to be supplied with pulsed working fluid.

* * * * *